(12) United States Patent
Pryor

(10) Patent No.: US 6,173,527 B1
(45) Date of Patent: Jan. 16, 2001

(54) METHOD FOR TREATMENT OF TOP SOIL OF A FIELD WITH OZONE GAS TO INCREASE GROWTH OF PLANTS

(75) Inventor: Alan E. Pryor, Sunnyvale, CA (US)

(73) Assignee: Soilzone, Inc., Sunnyvale, CA (US)

( * ) Notice: Under 35 U.S.C. 154(b), the term of this patent shall be extended for 0 days.

(21) Appl. No.: 09/042,063

(22) Filed: Mar. 13, 1998

(51) Int. Cl.$^7$ .............................. A61L 2/20; A01C 23/00; C02F 1/78
(52) U.S. Cl. ........................... 47/58.1; 435/243; 435/244; 435/254.6; 111/118; 422/32; 210/760; 210/764
(58) Field of Search .............................. 47/58.1; 210/760, 210/764; 422/32; 111/118; 435/243, 244, 254.6; A61L 2/20; A01C 23/00; C02F 1/78

(56) References Cited

U.S. PATENT DOCUMENTS

| | | | |
|---|---|---|---|
| 5,269,943 | * 12/1993 | Wickramanayake | 210/747 |
| 5,560,737 | 10/1996 | Schuring et al. | 405/128 |
| 5,566,627 | * 10/1996 | Pryor | 111/118 |

OTHER PUBLICATIONS

Legube, B. et al., "Ozonation of an Extracted Aquatic Fulvic Acid: Theoretical and Practical Aspects", Ozone Science and Engineering, vol. 11, pp. 69–92, 1989.*

Larose, J. et al., "Elimination of Humic Materials", Ozone Science and Engineering, vol. 4, pp. 79–89, 1982.*

Brunet, R. et al., "The Influence of the Ozonation Dosage on the Structure and Biodegradability of Pollutants in Water, and its Effect on Activated Carbon Filtration", Ozone Science and Engineering, vol. 4, pp. 15–32, 1982.*

Wang, B. et al., "Ammonia, Nitrite and Nitrate Nitrogen Removal From Polluted Source Water With Ozonation and BAC Processes", Ozone Science and Engineering, vol. 11, pp. 227–244, 1989.*

* cited by examiner

Primary Examiner—Leon B. Lankford, Jr.
(74) Attorney, Agent, or Firm—Skjerven, Morrill, MacPherson, Franklin & Friel LLP

(57) ABSTRACT

An ozone containing gas is injected into a portion of top soil that was previously oversaturated with water, to stimulate the propagation and growth of living organisms. The injected ozone oxidizes at least one molecule (also called "parent molecule") in the top soil to create at least one byproduct that is smaller than the parent molecule. The small size of such byproducts allows the byproducts to cause the growth of living organisms (such as plants including fungi and tomatoes). The byproducts can be used to grow a fungi (such as Trichoderma, spp.) that is (1) parasitic to detrimental fungi such as fusarium or is (2) a stimulant for chlorophyll-bearing plants, or is both. The byproducts can also be used to directly grow the chlorophyll-bearing plants. An ozone containing gas can be injected via a soil injector connected to an ozone supplier that is either stationary or is moved over a field, e.g. by a vehicle. Alternatively, top soil in a field can be injected with gaseous ozone by an arrangement of conduits, or can be transferred to a chamber for in-vitro treatment. The ozone containing gas can include carbon dioxide that competes with ozone for interaction with the soil molecules and thereby preserves ozone.

18 Claims, 9 Drawing Sheets

METHOD FOR TREATMENT OF TOP SOIL OF A FIELD WITH OZONE GAS TO INCREASE GROWTH OF PLANTS

This invention was made with government support under "EPA ASSISTANCE AGREEMENT/AMENDMENT", Assistance ID No. X 825560-01-0 awarded on Apr. 3, 1997 by the U.S. Environmental Protection Agency. The government has certain rights in the invention.

FIELD OF THE INVENTION

This invention relates to a method of treatment of agricultural top soil to increase the growth of living organisms, and in particular to a method of treating top soil with an ozone containing gas to increase the growth of plants in the top soil.

BACKGROUND OF THE INVENTION

In the agricultural industry, weeds, insects, nematodes, bacteria and other single celled or multi-celled living organisms in the top soil of a field, are killed immediately prior to growing crops, for example by application of methyl bromide. Methyl bromide destroys living cells once transported across the cell walls. However, methyl bromide is being phased out of agricultural use due to deleterious effect on the ozone layer of earth and due to a hazard to human health.

Ozone dissolved in aqueous solutions (also called "aqueous ozone") is used for inhibition or reduction of biological life forms such as molds, fungi, bacteria, algae, in numerous applications including swimming pools, potable water, bottled water, aquaria, fish hatcheries, and cooling towers. However, application of aqueous ozone to soil is not expected to be effective to kill living organisms because aqueous ozone has the drawback of slow dispersion of water into and through the soil of a field. Also, aqueous ozone suffers from rapid breakdown of ozone, so that maintaining sufficiently high concentrations of ozone in the water in soil can be difficult. Aqueous ozone has a half life on the order of minutes in ambient conditions.

Moreover, according to traditional thinking, if gaseous ozone were used for soil treatment, ozone would quickly dissolve in the entrapped soil moisture and rapidly break down. Furthermore, conventional thinking suggests that dispersion of gaseous ozone would be inhibited by the compacted, compressed nature of soil in a field or that untoward emissions of ozone gas would escape from a field into the atmosphere and so minimize ozone's effectiveness. Traditional thinking also indicated that the sometimes high concentration of naturally occurring organic compounds in soil close to the surface of a field can consume large amounts of ozone and so result in insufficient exposure of living organisms to ozone.

To "increase the stability of the ozone in the soil environment," prior art teaches that an "ozone containing gas is treated with acid" (see abstract of U.S. Pat. No. 5,269,943 to Wickramanayake). Regarding untreated ozone, Wickramanayake states that "long-term treatment of soils to remove contaminants with untreated ozone is not feasible since ozone decomposes too rapidly" (column 6, lines 31–33), and that "ozone that was not acidified was not expected to be useful especially for the treatment of larger quantities of soils" (column 8, lines 25–27).

Wickramanayake also states that his "treatment results in degradation of the organic compounds to less hazardous compound or compounds that are more readily biodegradable than the parent compound" (column 1, lines 14–17). Wickramanayake further states that "[a]fter the decontamination process, if the soil is found to be too acidic, the pH may be increased to the required level by applying unacidified gas ozone mixture for some time" (column 9, lines 65–68).

However, for "field applications," Wickramanayake requires "injecting of a stabilized gas-ozone mixture . . . into one or more injection wells in the contaminated areas. The distribution of the well bank is to be determined by the effective ozonation zone in the subsurface" (column 9, lines 45–50). In contrast, U.S. Pat. No. 5,566,627 describes the "agricultural use of ozone ($O_3$) to sanitize, i.e. kill or weaken living organisms in top soil suitable for plant growth purposes" (column 2, lines 31–34). See also U.S. Pat. No. 5,624,635.

SUMMARY OF THE INVENTION

In accordance with the invention, ozone in gaseous form is injected into top soil that is suitable for plant growth purposes (in a step called "top soil ozonation") to increase the growth of plants in the top soil. The injected ozone creates byproducts, e.g. by oxidizing molecules (also called "parent molecules") in the top soil.

The byproducts are smaller than (and in some embodiments carry more electrical charge than) the parent molecules. The byproducts increase the growth of plants (such as chlorophyll-deficient plants e.g. fungi, or chlorophyll-bearing plants e.g. tomatoes) by several times (e.g. 64 times) as compared to the parent molecules. Specifically, the smaller size and the greater charge of a byproduct are believed to cause a byproduct to more easily interact with (e.g. be digested by) living cells of a plant, as compared to the parent molecule. The interaction can be by (1) stimulation wherein the byproduct contacts a cell wall of the plant, or (2) nutrition wherein the byproduct passes through the cell wall of the plant and gets assimilated, or both.

In an example of stimulation, the byproducts of top soil ozonation cause growth of fungi that in turn cause an increase in the growth of chlorophyll-bearing plants. In another example of stimulation, a byproduct causes growth of a first fungus that is fungicidal to a second fungus that in turn is pathogenic to plants (e.g. tomato) to be grown in the top soil. In yet another example of stimulation, certain molecules in the top soil bind and retain various compounds, and the bound compounds are released on ozonation of the top soil. Such released compounds have, on the whole, a stimulatory effect on various living organisms (although depending on the soil composition some of the released compounds can be toxic to plant cells).

In examples of nutrition, molecules that occur naturally in top soil, such as organic and inorganic compounds, are broken down by ozone into byproducts that are consumed as nutrients by plants grown in the top soil. Moreover, on ozonation, organic compounds that contain nitrogen release ammonia that acts as a nutrient for chlorophyll-bearing plants or fungi or both.

The above-described ozonation of top soil can be performed (1) prior to seeding or planting (e.g. at the time of fertilization), or (2) after seeding or planting or (3) both. Moreover, top soil ozonation can be used in conjunction with traditional agricultural operations such as (1) tilling, (2) applying microorganisms to the soil, (3) fertilization, (4) irrigation, (5) sowing seeds or transplanting plants, (6) spraying herbicides or pesticides, and (7) harvesting crops.

Also, ozone has a negligible deleterious effect on the environment because ozone breaks down into simple diatomic oxygen on reaction with an organic or inorganic compound or due to ozone's inherent instability. Hence, ozonation of top soil as described herein can be applied repeatedly, as often as necessary. Top soil ozonation can be performed once per season or even several times per season. Therefore, ozonation of top soil to increase the growth of plants as described herein is functionally effective, environmentally benign, and easy to use.

In one embodiment, a gas (hereinafter "ozone containing gas") that contains ozone and a carrier gas is generated by an ozone supplier, and is injected through a soil injector into the top soil. The ozone supplier can be moved over the field by a structure, such as a trailer or a vehicle. The ozone supplier includes an ozone containing chamber in one implementation, and a corona ozone generator in another implementation. The ozone containing gas can be injected into the top soil immediately subsequent to ozone generation. Alternatively, the ozone containing gas can be injected after pretreatment to stabilize the ozone, thereby causing byproducts to be generated over a larger distance from the point of application, as compared to the distance for untreated ozone.

In another embodiment, the ozone containing gas is injected into top soil using an arrangement of conduits buried in a field. Such an arrangement of conduits allows easy, timely, and frequent application of ozone, and is especially suited for multiple ozone treatments of top soil during a growing season when field access is otherwise limited. Such conduits are a critical aspect in this embodiment, and are also used for adding water as described below.

In yet another embodiment, top soil from a field is transferred to a chamber, and is subjected to in-vitro ozonation. Specifically, the top soil is exposed to gaseous ozone in sufficient concentration for a sufficient period of time such that the byproducts of ozonation stimulate the propagation and growth of a predetermined number, for example a majority, of a specific organism (e.g. fungi) in the soil. Such ozonation of top soil is especially suited for nursery plants where in-vitro handling of soils is often required.

Moreover, in one embodiment, the top soil has a portion (e.g. 10% or more) that is to be subsequently exposed to ozone, and at least 10% of this portion is oversaturated with water (either artificially or naturally) by adding water to the top soil (in a field or in a chamber) to a level greater than saturation (at which level the soil holds the maximum amount of water under ambient conditions). In two alternative embodiments, water is added in a chamber to either saturation level or below saturation (e.g. 0.1 percent or more below saturation). The addition of water to top soil as described herein causes one or more particles in the soil that are otherwise unexposed to water to dissolve or hydrate in the added water.

In a first example, a parent molecule (described above) is formed by hydration of a naturally occurring molecule (also called "grandparent molecule") that is unhydrated prior to the saturation step. In a second example, after the addition of water, a parent molecule is formed by dissolution of a grandparent molecule that is soluble in water but is undissolved prior to oversaturation.

In another example, instead of the parent molecule, a byproduct of top soil ozonation is hydrated or dissolved in the added water. Therefore, even if a byproduct is normally incapable of interacting with a plant cell, the byproduct when dissolved in the added water acts as a stimulant to the plant cell, or acts as a nutrient that passes through the wall of the plant cell.

In one implementation, the addition of water to the top soil is followed immediately by an optional step of desaturation of the soil (either artificially or naturally) partially (i.e. not completely) to a moisture level below saturation. The desaturation of oversaturated or saturated soil allows the ozone containing gas to more easily penetrate and permeate the top soil than if the soil remained oversaturated. Moreover, in one implementation, the soil is rendered homogeneous (e.g. by tilling) prior to oversaturation, so that the ozone containing gas travels more uniformly through the soil than otherwise.

BRIEF DESCRIPTION OF THE DRAWINGS

FIG. 4A-1 illustrates holes in a conduit 110I in FIGS. 4A and 4C.

DETAILED DESCRIPTION

Figure 1:
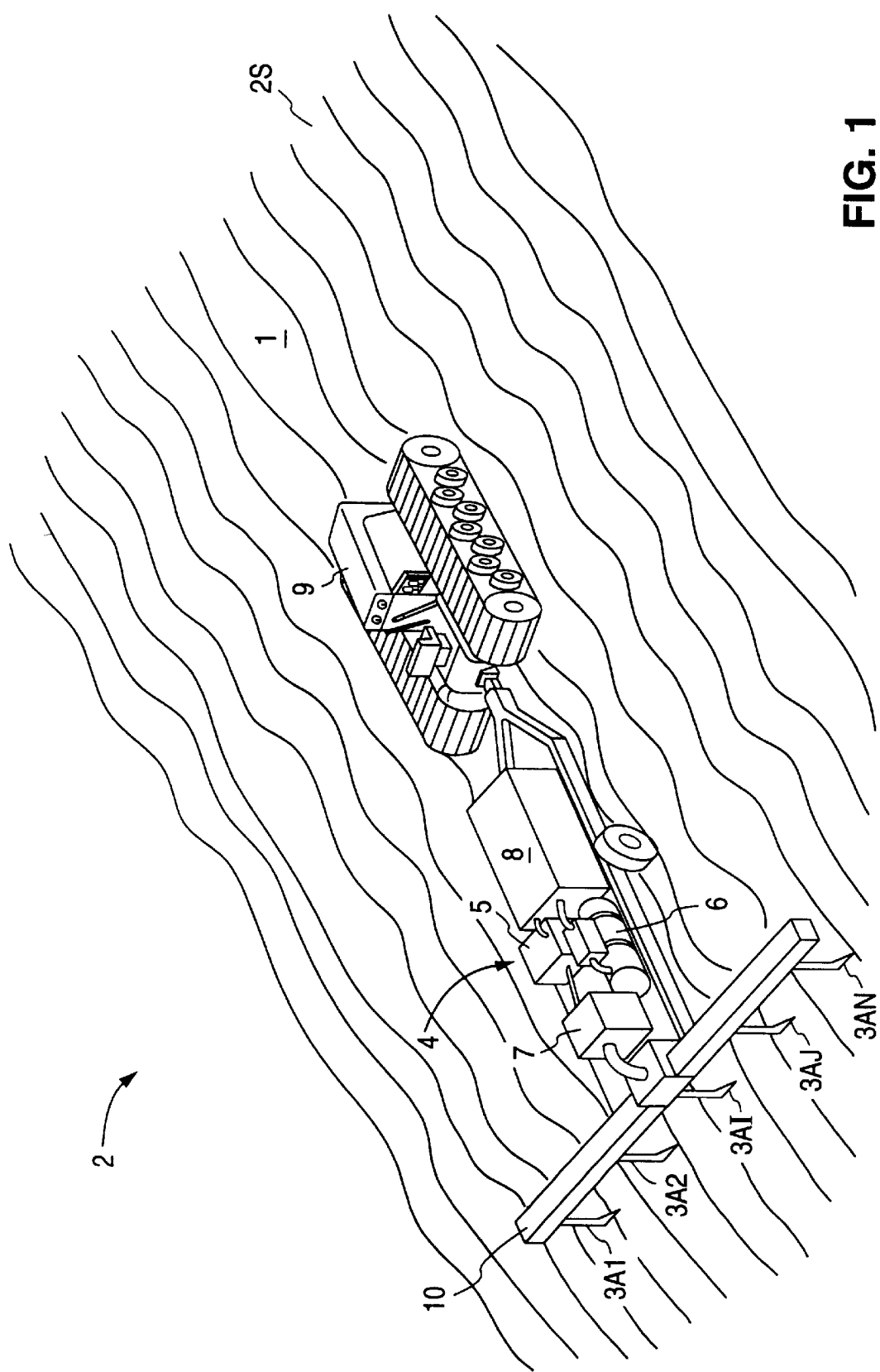
FIGS. 1 and 2 respectively illustrate two embodiments of this invention for ozonation of (1) soil in a field, and (2) soil in a localized environment (such as soil for tree or vine replants).

According to the principles of this invention, ozone ($O_3$) in gaseous form is injected (in a process called "ozonation") into the top soil of a field to promote the growth of various types of plants (such as chlorophyll-deficient plants, e.g. fungi Trichoderma, spp., and chlorophyll-bearing plants, e.g. tomatoes). Ozone ($O_3$) oxidizes molecules in the top soil to form byproducts that cause an increase in plant growth, e.g. by acting as nutrients or as stimulants for the plants (in a process called "direct growth enhancement") or for fungi that in turn stimulate plant growth (in a process called "indirect growth enhancement").

In one embodiment, prior to the ozonation, 10% or more of a to-be-ozonated portion of the top soil is oversaturated with water. In two embodiments, (1) a majority of the to-be-ozonated portion and (2) all of the to-be-ozonated portion respectively are at least saturated with water. The percentage of a to-be-ozonated soil portion that is saturated varies, depending on the state of soil molecules, specifically on the percentage of the to-be-ozonated soil molecules that are already in a hydrated or dissolved state (as described below) prior to the addition of water.

Field 2 (FIG. 1) is any space used for plant growth purposes including, but not limited to, open or cultivated fields, seed beds, orchards, vineyards and nursery soils. Soil 1 is any natural or artificial substance suitable for rooting and plant growth purposes, such as agricultural top soil including clay, sand rock or organic substrates. Top soil is soil that is close enough to the surface to be worked (i.e. plowed tilted, disced or otherwise manipulated) by a farmer.

Top soil can be soil within depth d (FIG. 3A) from the surface 2S of field 2. For example, "d" can be six feet or two feet or six inches or any other appropriate depth.

Surface 2S of field 2 (FIG. 1) conforms to the naturally occurring surface of planet earth, and excludes artificial and underground surfaces, such as surfaces of injection wells described in U.S. Pat. No. 5,269,943 granted to Wickramanayake at column 9, line 47. Therefore, top soil does not include for example, soil adjacent to discharges of injection wells.

Soil 1 is suitable for plant growth purposes and may include a normal amount of organic impurities such as pesticides and herbicides and may also include living biological microorganisms, such as fungi and bacteria. In one embodiment, soil 1 is top soil in a field 2 (FIG. 1) that was recently cultivated for growth of plants, for example strawberries.

Typically, soil 1 might include some undesirable organisms, such as fungi (also called "first fungi") e.g. *verticillium alboatrum* (fungus)—leafwilt or *fusarium oxysporum* (fungus)—leafwilt, that are preferably (but not necessarily) controlled by a parasitic fungi (also called "second fungi"), such as Trichoderma spp. The second fungi may also exist naturally in soil 1 or may be added to soil 1.

In one embodiment, ozonation of soil 1 causes the second fungi to propagate and grow prior to and during the next use of soil 1 for growing strawberries, to reduce populations of the first fungi (that can be a saprophytic fungi). In another embodiment, the second fungi is grown only during the next use of soil 1 for growing strawberries. Therefore, populations of the first fungi that are pathogenic to chlorophyll-bearing plants (such as strawberries) can be controlled by ozonation of top soil 1 as described herein.

Soil that is unsuitable for plant growth purposes includes, for example, soil contaminated with organic compounds, such as those described in U.S. Pat. No. 5,269,943 granted to Wickramanayake that is incorporated by reference herein in its entirety. An example of soil unfit for plant growth purposes is soil in a field that is contaminated by accidents, such as spills and leaks from underground storage tanks and, pipelines and tank car derailments, as noted by wickramanayake. Soil can also be contaminated by, for example, excessive application of pesticides or herbicides and by land disposal of hazardous organic wastes, as noted by Wickramanayake.

Soil 1 (FIG. 1) is optionally rendered uniformly homogeneous in texture and free of clumps that inhibit free passage of a gas through soil 1. A clump is an agglomeration of soil particles that can be physically handled as a group. Physical handling includes, for example, manually lifting a handful of soil 1 from field 2.

Conventional processes such as shanking, discing, tilling, and springtoothing can be used to render soil 1 in field 2 uniformly homogeneous. After rendering soil 1 homogeneous, the majority of clumps in soil 1 have a side less than or equal to, for example 1 inch, 0.50 inch, or 0.25 inch, depending on the extent of processing of soil 1.

Rendering soil 1 homogeneous exposes the pores in soil particles and the interstitial spaces in the clumps to water and to gaseous ozone. Specifically, rendering soil 1 homogeneous causes molecules (also called "soil molecules") in soil 1 (e.g. organics and minerals bound to surfaces of soil particles) to be exposed to water to be hydrated or dissolved and to ozone when an ozone containing gas is applied, (either subsequently or simultaneously) as described below.

Moreover, rendering soil 1 homogeneous causes a significant portion of a living organism to be exposed to the byproducts of ozone's interactions with the soil molecules. A significant portion of a living organism (such as plant, e.g. fungus or tomato) is any portion that when exposed to the byproducts results in an increase in the propagation and growth of the living organism. An example of a significant portion is an exposed cell.

The application of gaseous ozone to homogeneous soil 1 (after addition of water) results in subsequent enhanced growth of plants, for example as illustrated in step 806 (FIG. 8), for the following reason. Ozone creates byproducts by oxidation of soil molecules, and the byproducts directly cause the propagation and growth of chlorophyll-bearing plants, or cause the growth of other living organisms (such as fungi) that in turn stimulate the propagation and growth of plants.

Prior to ozonation, soil 1 in field 2 is oversaturated with water so that at least a portion of soil 1 (in one embodiment a majority of soil 1) has the composition of a slurry (a watery mixture containing more water than the water required for saturation, saturation being a level at which the soil holds as much water as possible). Soil 1 can be oversaturated by various natural processes (e.g. by rain) or artificial processes (e.g. by flood irrigation).

The added water dissolves the byproducts of ozonation, and such dissolved byproducts are more easily assimilated by the plants, as compared to ozonation without the oversaturation. Depending on the composition of soil 1, the added water also causes the to-be-oxidized molecules to dissolve (i.e. cause to be dispersed in the water) or to hydrate (i.e. cause to chemically combine with the water to form complex or compound ions). In one embodiment, after the oversaturation, and prior to the ozonation, soil 1 is desaturated (e.g. mixed with unsaturated soil or dried or allowed to dry).

Next, soil 1 is ozonated by applying an ozone containing gas using a device (also called "soil injector support device") 10 to which soil injectors 3A (FIG. 1) are attached. An ozone containing gas includes, for example, ozone carried in a carrier gas such as air or oxygen. In one embodiment, ozone in the ozone containing gas is unacidified, whereas in another embodiment the ozone is acidified as described in U.S. Pat. No. 5,269,943.

Moreover, in one embodiment, carbon dioxide is included in the carrier gas. Carbon dioxide increases the distance of movement of ozone through soil 1 with less degradation of ozone than when air or oxygen alone is used as a carrier gas. Specifically, carbon dioxide competes with ozone for soil molecules that would otherwise be oxidized by ozone, thereby preserving ozone.

Such increase in the distance of ozone movement due to carbon dioxide (or other competitive agent) ensures that more elements in soil 1 that need to be broken down (such as organic and inorganic molecules) are exposed to the ozone than in the absence of such a competitive agent. Furthermore, carbon dioxide is less expensive than ozone. Also, addition of carbon dioxide increases the volume of gas flow, and therefore also increases the linear velocity of the ozone containing gas during movement through soil 1, thereby expanding the region of application of gaseous ozone (as compared to ozonation without the additional carbon dioxide).

Figure 3A:
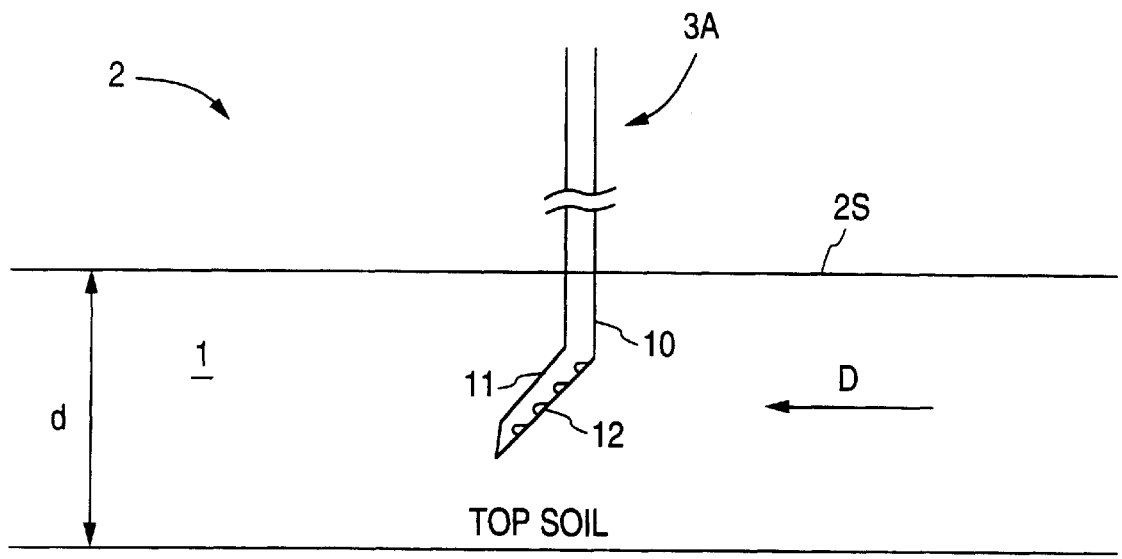
FIGS. 3A and 3B illustrate two embodiments of a soil injector for ozonation of top soil.

Although FIG. 1 shows a number of soil injectors 3A for injecting the ozone containing gas into soil 1, any mechanism conventionally used in the application of gases or liquids to soil can be used to apply gaseous ozone. In the embodiment of FIG. 1, soil injectors 3A1–3AN (where $1 \leq I \leq N$, N being the total number of injectors) are placed within a distance not exceeding three feet from the point in soil 1 at which an increase in growth of plants is desired. Therefore, soil injectors 3AI and 3AJ are three feet apart each from the other, and extend no more than three feet deep into soil 1 from surface 2S of field 2 (FIG. 3A)

After injection, the ozone containing gas disperses through interstitial spaces (not shown) between the particles (also not shown) in soil 1, and into pores (also not shown) within the soil particles. Various materials in soil 1 (including organic and inorganic compounds) are oxidized by gaseous ozone. Ozone breaks down large complex organic molecules into smaller and more polar molecules (also called "byproducts"), and eventually into $H_2O$ and $CO_2$. As soil 1 is free of contaminants of the type described by Wickramanayake, the amount of ozone necessary to generate byproducts that stimulate the propagation and growth of living organisms is less than the amount of ozone needed for decontamination.

Therefore, in accordance with the invention, a majority of the byproducts are not further broken down by ozone into $H_2O$ and $CO_2$. Instead, one or more of the byproducts are used to increase the growth of adjacent living organisms (such as plants that can be either (1) chlorophyll deficient plants e.g. fungi, or (2) chlorophyll bearing plants e.g. tomatoes). The byproducts can interact with the plants by one of two processes: by stimulation wherein a byproduct contacts a cell wall, or by nutrition wherein the byproduct passes through the cell wall.

In an example of stimulation, byproducts of ozonation cause growth of a fungus, such as Trichoderma spp. (e.g. by acting as stimulants), and the fungus in turn causes an increase in plant growth (e.g. by acting as a stimulant). Specifically, Trichoderma spp. interferes with a growth regulator (such as auxin) that inhibits the growth of a plant's roots. When such a growth regulator is rendered ineffective, a plant experiences enhanced growth (as compared to growth in the presence of the growth regulator).

In another example of stimulation, the byproducts cause growth of a first fungus (e.g. by acting as nutrients), and the first fungus is fungicidal to a second fungus that is pathogenic to chlorophyll-bearing plants (e.g. tomato). The first fungus is a parasite (e.g. Trichoderma spp.) that draws nutrients from a cell of the second fungus (e.g. *verticellium* or *fusarium*). Hence, growth of the first fungus kills the second fungus, and in the absence of the second fungus, various chlorophyll-bearing plants (such as strawberries) experience enhanced growth.

Therefore, in one particular embodiment, prior to ozonation, first fungi Trichoderma spp. are added to soil 1 (FIG. 1) e.g. in the form of an emulsion in water that is applied to soil 1 during a saturation step (described above), or as granules that are sprinkled on soil 1. In this embodiment, first fungi Trichoderma spp. experience enhanced growth in soil 1, and results in indirect growth enhancement.

Specifically, first fungi Trichoderma spp. that are grown by use of the byproducts of top soil ozonation act in both the ways described above, i.e. are fungicidal to second fungi (such as *verticillum*), and also interfere with a growth regulator, thereby to provide a significant (e.g. 25%) increase in the growth of chlorophyll-bearing plants (as compared to plant growth in the absence of top soil ozonation). Suppression of auxin by Trichoderma enhances growth as described in, for example, "The Role Of Auxin In Enhanced Root Growth of Trichoderma-colonized sweet corn," Lisa M. Blanchard and Thomas Bjorkman, Proceedings of Amer. Soc. Hort. Sci., Lexington, Ky., 1996, incorporated by reference herein in its entirety.

In yet another example of stimulation, certain molecules (such as humic acids) in soil 1 bind and retain various compounds (such as metallic cations, oxides, hydroxides, fatty acids, peptides and insecticides). Such bound compounds are released on oxidation by gaseous ozone, and as a whole have a stimulatory effect on various organisms (such as fungi and chlorophyll-bearing plants), although some of the released compounds can be toxic to plant cells. Two examples of such a bound compound are believed to be iron oxide and ionic iron.

In examples of nutrition, molecules that occur naturally in top soil, such as inorganic and organic compounds are undissolved (either insoluble or soluble but not dissolved due to insufficient water) prior to the above-described saturation, and dissolve in water added during such saturation. Thereafter on ozonation, the dissolved compounds (also called "parent molecules") are broken down by gaseous ozone into byproducts that are smaller and more polar than the parent molecules.

An example of an inorganic compound is $NH_3$ gas that is trapped in voids in soil clumps (not shown), and is believed to be changed to $NO_3$ due to top soil ozonation after saturation with water. Organic compounds can be, e.g. acetic acid and acetic aldehyde that also dissolve in water, and on ozonation form byproducts such as $CO_2$. Examples of organic compounds include organic acids (such as humic and fulvic acids), proteins, amino sugars and polysaccharides), and compounds that contain nitrogen (such as amino acids, amides, hetrocyclic nitrogen compounds and ammoniacial nitrogen compounds).

Such organic compounds are insoluble or partially soluble in water, and are oxidized by gaseous ozone. Oxidation of such organic molecules results in byproducts such as alkanes, aliphatic diacids, aldehydes, aliphatic keto compounds, benzoic acids, phthalates and furans. An example of such a byproduct is believed to be benzocarboxylic acid.

The byproducts are consumed as nutrients by soil organisms (such as the fungus Trichoderma spp.) thereby increasing growth, as compared to growth in the absence of top soil ozonation. Moreover, on ozonation, organic compounds that contain nitrogen release ammonia ($NH_3$), and ammonia is converted by gaseous ozone into nitrate ions, and the nitrate ions act as nutrients for certain fungi and certain chlorophyll-bearing plants as described herein.

Conversion of ammonia into nitrate ions is just one example of molecules (e.g. ammonia) in soil 1 that interact with ozone only in the gas phase. Soil 1, by virtue of being suitable for plant growth purposes, has a pH less than 10.0. Therefore, gaseous ozone is better for oxidation of ammonia in soil 1 than aqueous ozone that requires soil 1 to have a pH greater than 10.0 for reaction with ammonia.

Furthermore, aqueous ozone when applied to soil 1 decomposes into hydroxyl free radicals that have a very short half life, e.g. less than 1 second. Such hydroxyl free radicals are not created by injection into soil 1 of gaseous ozone. Hence, gaseous ozone lasts longer in soil 1 than aqueous ozone. Therefore, application of gaseous ozone (rather than aqueous ozone) to soil 1 as described herein is a critical aspect of this invention.

In one embodiment, the following process parameters are used in applying an ozone containing gas to stimulate the propagation and growth of chlorophyll-bearing plants in soil 1. Soil 1 is fit for plant growth purposes, and contains a number of fungi (e.g. Trichoderma spp.) that propagate and grow prior to and coextensive with the growth of chlorophyll-bearing plants.

Moreover, in this embodiment, at least 10% of the to-be-ozonated portion of soil 1 has been saturated or oversaturated with water prior to the moment of ozonation. Depending on composition of soil 1, a different amount of water is needed to saturate soil 1. For example, some soils, such as organic peat soils are not saturated until water is 30% or more by weight. Therefore, in such soils an amount of water required to reach 30% weight can be added either by mixing soil 1 and water in a saturator (described below), or added directly to field 2 e.g. through conduits under the surface of field 2.

Soil 1 is at a temperature less than or approximately equal to 110 degrees Fahrenheit. Thereafter, an ozone containing gas is injected into soil 1 at a depth in the range of greater than or approximately equal to 6 inches but no greater than or approximately equal to three feet from surface 2S of field 2.

In one embodiment, the depth at which an ozone containing gas is injected into soil 1 is critical to stimulate the propagation and growth of the majority of fungi in soil 1. If the ozone containing gas is merely applied to surface 2S of field 2, without being injected into soil 1, byproducts are formed only on surface 2S if the ozone containing gas is not lost into the atmosphere. On the other hand, if the ozone containing gas is injected into an injection well, such as the injection wells described in U.S. Pat. No. 5,269,943 to Wickramanayake at col. 9, line 47 the majority of the living organisms in the top soil of field 2 will remain unexposed to the byproducts that are formed at the bottom of such wells.

After top soil ozonation, a time weighted average of ozone concentration in the air over field 2 results in exposure to individuals of less than (1) 0.1 part per million over an eight hour period; and (2) 0.3 part per million over a fifteen minute period. The use of gaseous ozone in a concentration in the ranges described herein results in acceptable ozone levels over field 2 i.e. less than the human exposure threshold time weighted average limit of 0.1 part per million (ppm) permitted by the U.S. Occupational Safety and Health Administration Department (O.S.H.A.).

Ozone containing gas is injected at various points in field 2, and is supplied to soil injectors 3A1–3AN (FIG. 1) or to injector 3B (FIG. 2) from an ozone supplier 4. Ozone supplier 4 (FIGS. 1 and 2) is any device used for supplying an ozone containing gas. For example, ozone supplier 4 can be a Hankin Ozotec model II available from Hankin Atlas Ozone Systems in Scarborough, Ontario Canada. In one embodiment, ozone supplier 4 includes an electric generator 8, an ozone generator with power supply 7, an air compressor 6 and an air purification system 5.

An ozone supplier 4 can also include an ozone chamber 13 of a size, such as 10 cubic feet, to equalize pressure imbalances or to mix or dilute the ozone containing gas with other gaseous elements. (See FIG. 2.) In one embodiment, the ozone containing gas is injected into soil 1 immediately subsequent to ozone generation, without any chemical pre-treatment of the ozone containing gas. In another embodiment, prior to injection, the ozone containing gas is stabilized by pretreatment with an acid as described by U.S. Pat. No. 5,269,943 to Wickramanayake or is enhanced by other methods, e.g. by addition of carbon dioxide as described above.

Ozone supplier 4 (FIG. 1) is moved by a device (also called "self propelled field device") 9, such as a tractor that propels itself. Device 9 can be replaced by any appropriate vehicle or equipment used for moving ozone supplier 4 relative to soil 1. Ozone supplier 4 is skid or trailer mounted and soil injectors 3A1–3AN are shanked into the ground. In one embodiment, ozone containing gas is generated as well as injected into soil 1 during the movement of device 9 over surface 2S of field 2. An ozone supplier can be incorporated into a vehicle rather than being skid or trailer mounted.

Figure 2:
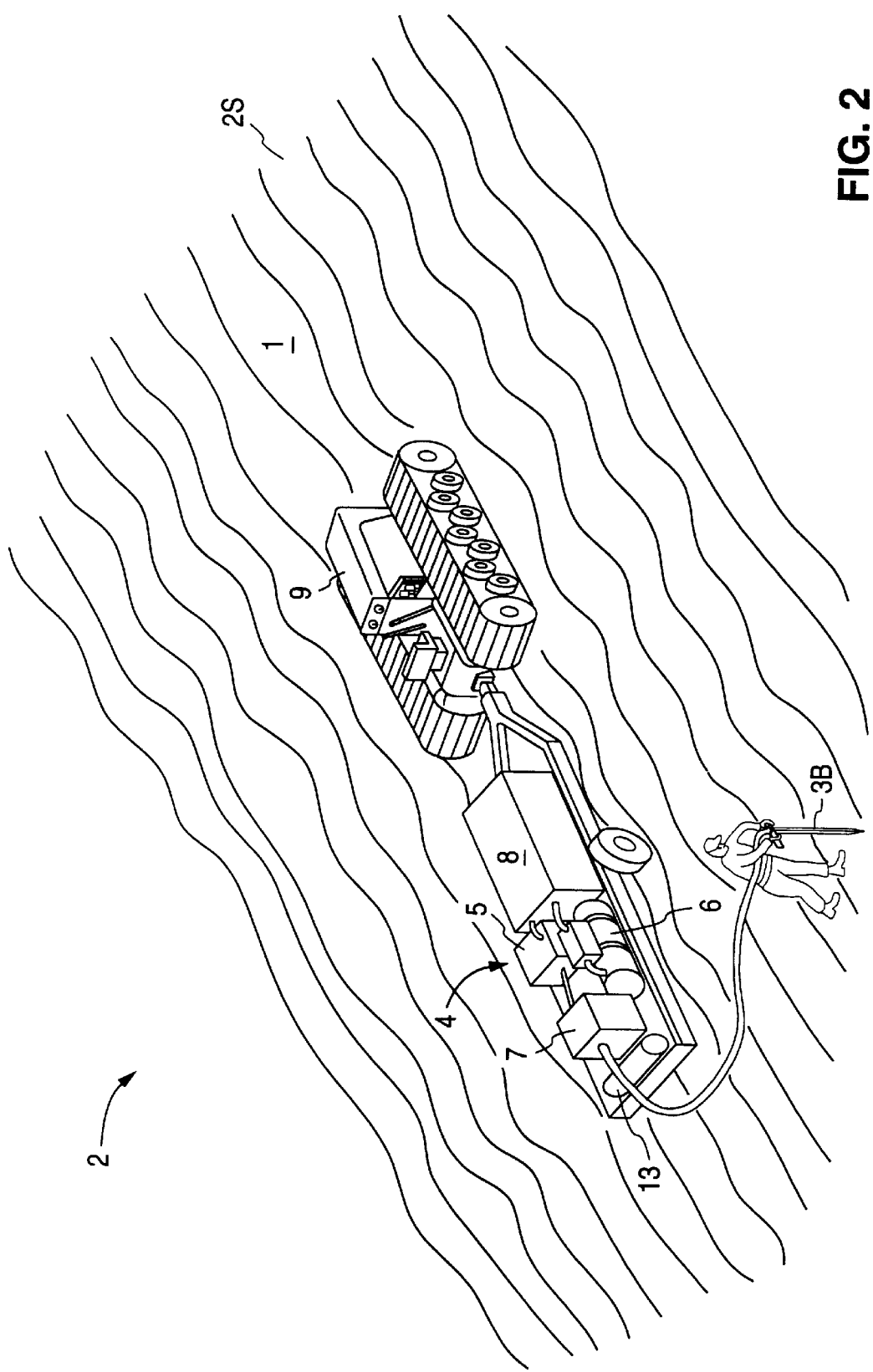
Figure 3B:
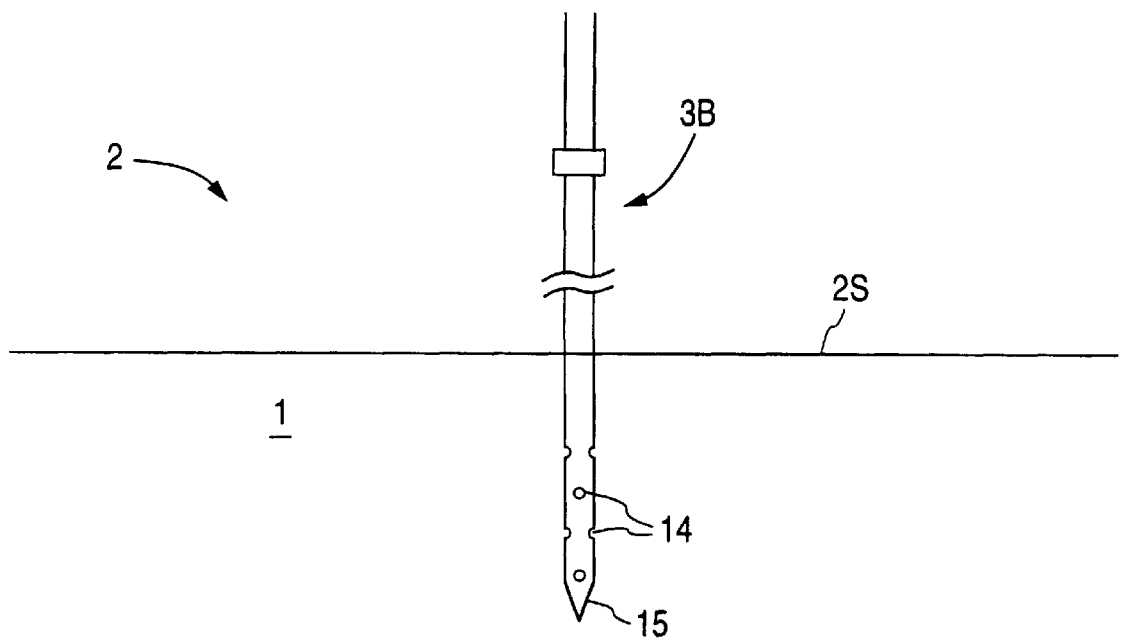

In another embodiment, a worker (FIG. 2) injects ozone locally into the soil using a hand held injector 3B of the type shown in FIG. 3B. Injector 3B is useful for example to inject ozone into localized regions of soil 1 to stimulate the propagation and growth of living organisms (e.g. fungi) around a replant, for example where it is not necessary or economical to treat the entire field 2.

In one implementation, a soil injector 3A (FIG. 3A) is used with a moving trailer (e.g. attached to device 9 as described above). Soil injector 3A includes an extended hollow pipe 10 with an angular end 11 bent in the direction of movement D. Pipe 10 has one or more holes 12, through which passes the ozone containing gas. Holes 12 are typically backward facing, opposite to direction of movement D (or downward facing) to prevent soil 1 from clogging holes 12.

In another implementation, soil injector 3B (FIG. 3B) includes an extended, hollow pipe 10, optionally with a sharpened end 15 to facilitate penetration of soil 1 for localized soil ozonation (FIG. 2). Soil injector 3B has one or more holes 14 through which the ozone containing gas is injected into soil 1. Although two embodiments of soil injectors are illustrated in FIGS. 3A and 3B, any conventional soil injector can be used. Furthermore, a soil injector can be either stationary or moveable, and either permanent or temporarily placed in accordance with this invention.

Figure 4A:
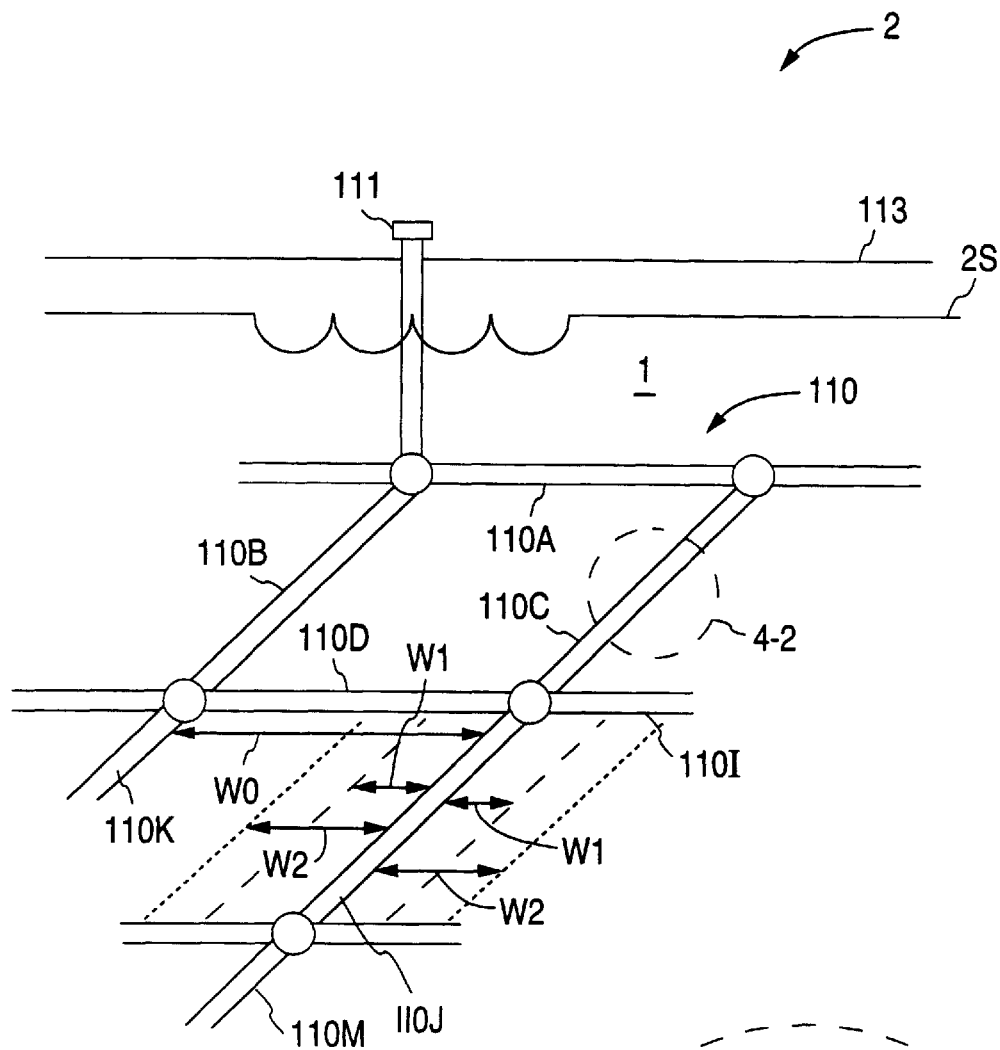
FIGS. 4A, 4B and 4C illustrate other embodiments of this invention for injecting an ozone containing gas into top soil in a field.
Figures 1, 4A:
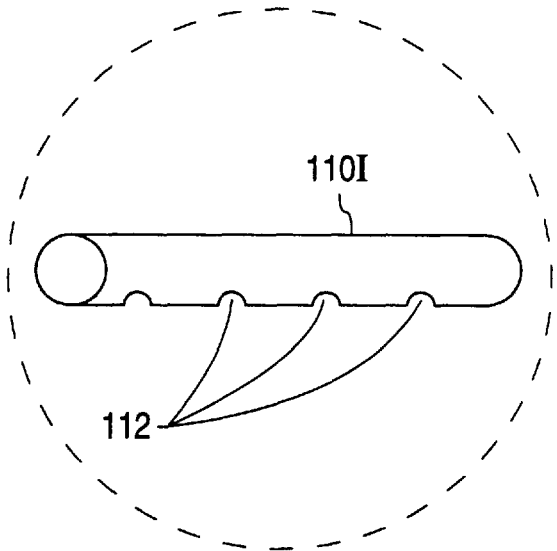

In another embodiment, a structure 110 of hollow conduits 110A–110M (FIG. 4A), where A≦I≦M, M being the total number of conduits, is buried under surface 2S of field 2. Although a generally rectangular lattice configuration of conduits 110A–110M is illustrated in FIG. 4A, conduits 110A–110M can be arranged in any manner appropriate for the injection of a gas into soil 1 in accordance with this invention. Adjacent conduits 110N and 110P are parallel to each other and are separated from each other by a distance W0 of, e.g. 32 inches.

The ozone containing gas enters at conduit inlet 111 of structure 110, is transmitted through conduits 110A–110M, and is injected into soil 1 through holes 112 (e.g. spaced 12 inches apart) in each conduit 110I (FIG. 4A-1). The ozone containing gas passes through a portion of the top soil in a region adjacent to holes 112, and breaks down by 90% or more within a lateral distance W1 (FIG. 4A) from a conduit 110J. Distance W1 (e.g. 12 inches) of penetration of ozone depends on several factors, such as the flow rate of the ozone containing gas and the moisture content of soil 1.

In one embodiment, conduits 110A–110M are polyvinyl chloride (PVC) pipes. Any ozone resistant piping held together by ozone resistant fittings, welds, or glue can also be used instead of PVC pipes including, for example, stainless steel or Teflon.

Conduits 110A–110M can be used for other purposes such as underground irrigation or fertilization when conduits 110A–110M are not used for injecting an ozone containing gas into soil 1. In one embodiment, conduits 110A–110M are buried in naturally occurring soil 1 suitable for plant growth (previously used for agriculture) and used to saturate or oversaturate soil 1 with water (e.g. by applying ½ gallon per hour for 5 hours from holes 112 in each conduit 100I), followed by ozonation 3 days later (e.g. as described below in reference to Table 2). The added water travels through a portion of top soil 1 within a distance W2 from each conduit 110J. Distance W2 is selected to be greater than W1 to ensure that at least 10% of the to-be-ozonated portion of top soil 1 is oversaturated with the added water. In one example, W2 is 16 inches (greater than W1 of 12 inches), and at least soil within 4 inches from conduit 110J becomes oversaturated.

At the time of ozonation, at least a portion of soil 1 was still saturated in this embodiment. Such multiple use of the same conduits 110A–110M is a critical aspect of this embodiment because the ozone gas is applied at the same location as the water, thereby to ensure that at least some portion of the previously saturated soil 1 is ozonated.

Figure 4B:
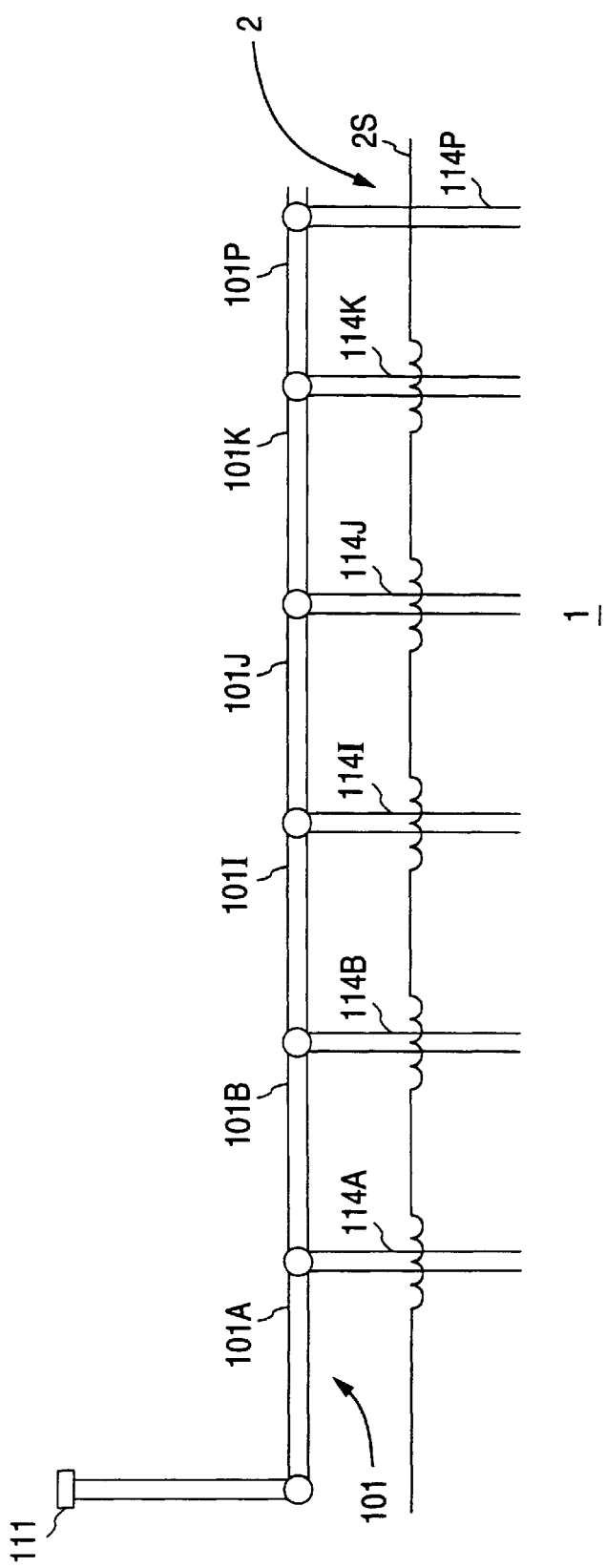

In still another embodiment, another structure 101 (FIG. 4B) of hollow conduits 101A–101P where $A \leq M \leq P$, P being the total number of such conduits, is disposed horizontally on or over a surface 2S of field 2. Structure 101 in FIG. 4B includes a conduit inlet 102 and vertical conduits 114A–114P with open ends inserted into soil 1. A conduit 114I can be a simple hollow pipe with an open end for discharging the ozone containing gas. Alternatively, a conduit 114I can be any conventional soil injector or one of soil injectors 3A or 3B described above in reference to FIG. 3A or 3B.

Soil 1 is optionally covered with a gas impermeable or semi-impermeable membrane 113 (FIG. 4A) immediately subsequent or prior to injection of the ozone containing gas (tarping). Tarping serves to keep the ozone containing gas within soil 1 thus: (1) minimizing untoward detrimental emissions of ozone into the atmosphere, (2) minimizing ozone production costs and (3) resulting in a synergistic solarization effect.

As used herein, the term "solarization" means the effect of tarping, or covering the soil to decrease heat losses from the soil to the atmosphere and to increase the ambient temperature of the soil due to the green-house effect. Although membrane 113 is shown only in FIG. 4A, membrane 113 can also be advantageously used in other embodiments such as FIGS. 1 and 2. The tarping equipment may be manual or automatic and may be incorporated into the soil injector support device 10 carrying soil injectors 3A (FIG. 1). Preferably, tarping is done prior to or immediately subsequent to the injection of an ozone containing gas.

Figure 4C:
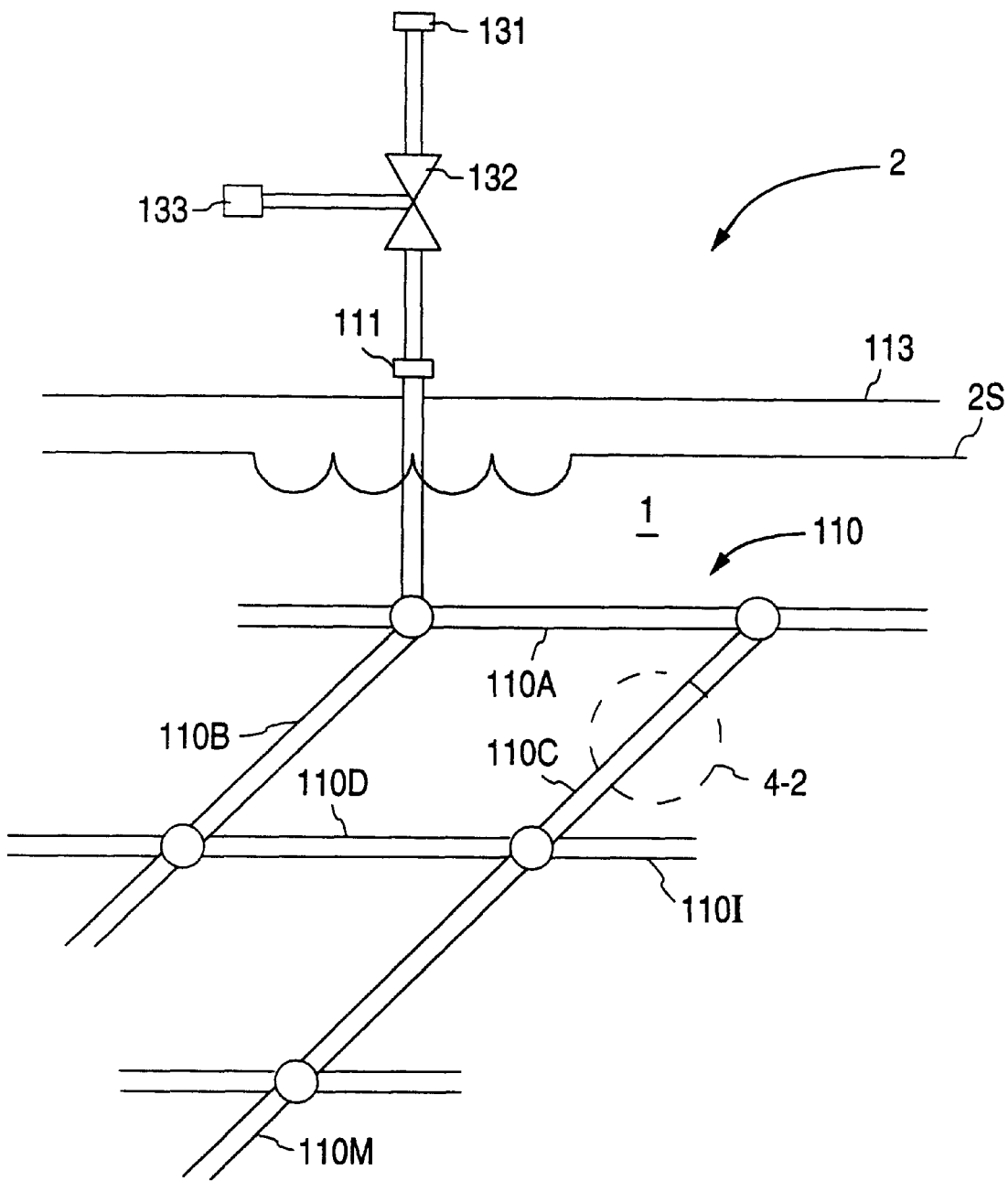

In another embodiment, instead of using conduits 110A–110M sequentially, for saturating or oversaturating soil 1 followed by ozonation, conduits 110A–110M are used to simultaneously saturate and ozonate soil 1 as illustrated in FIG. 4C. Specifically, conduits 110A–110M are coupled to an aspirator 132 that in turn is coupled to a gas inlet 133 at which the ozone containing gas is supplied, and to a water inlet 131. Aspirator 132 injects the ozone containing gas from inlet 133 into the water provided via inlet 131 thereby to supply a mixture of the water and ozone containing gas at conduit inlet 111.

The flow rates of the ozone containing gas and the water are controlled appropriately, so that at least some portions of soil 1 (FIG. 4C) become saturated (i.e. reach a moisture level as described herein) and also ozonated (i.e. receive an ozone dosage as described herein) to form the byproducts. In one particular embodiment, aspirator 132 is implemented by an ozone injector no. 1581 available from Mazzei Injector Corp., Bakersfield, Calif.

Figure 5:
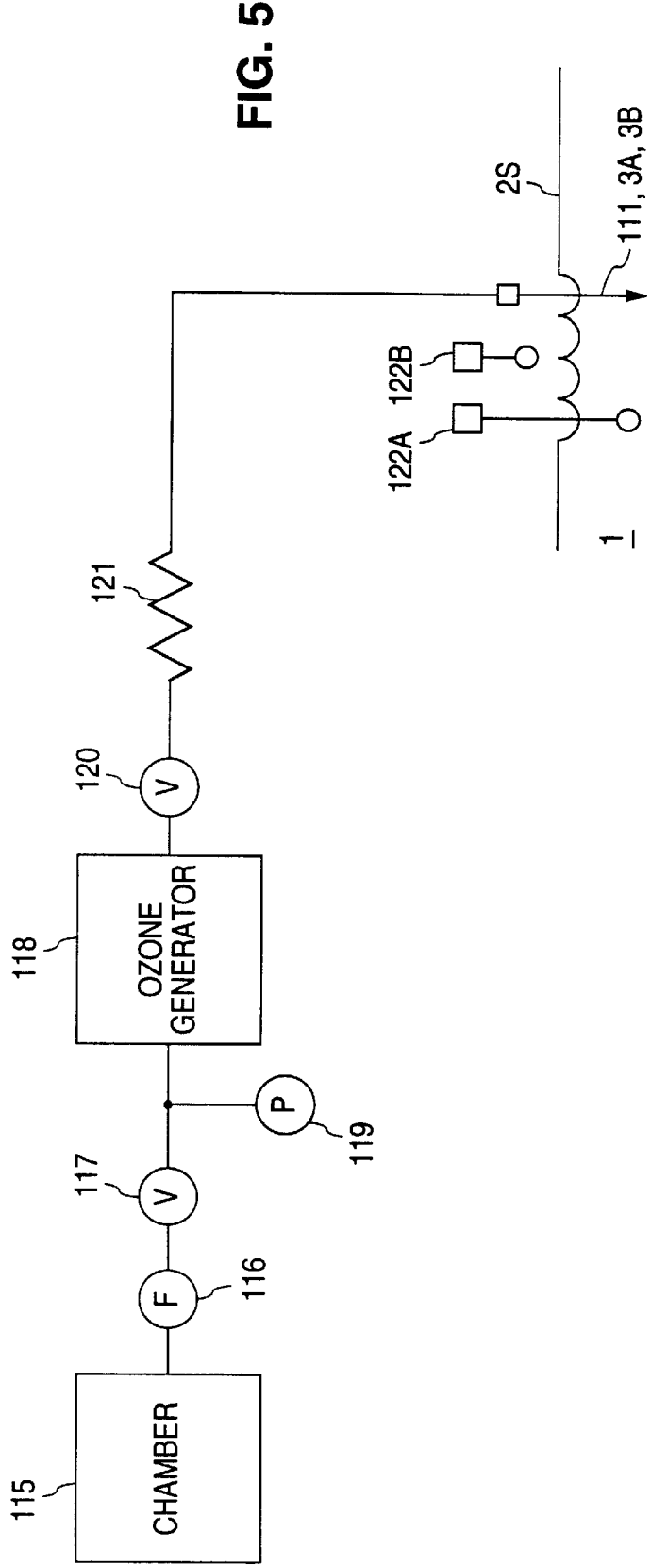
FIG. 5 is a block diagram illustrating in-situ ozonation of soil.

Using the equipment schematically illustrated in FIG. 5, dried oxygen containing gas (a gas that contains oxygen from which moisture has been substantially removed e.g. to a dew point of −60° C.) is produced in chamber 115 by a conventional process such as an air compressor followed by refrigeration, pressure swing absorption with silica desiccant, molecular sieve, or membrane separation. The dried oxygen containing gas is supplied via a conduit to a filter 116 prior to generation of ozone. Filter 116 can be a particulate or hydrocarbon filter.

One or more valves 117 control(s) the pressure of the dried purified oxygen containing gas that is supplied to ozone generator 118, to optimize ozone output and to limit over pressurization. Over pressurization can damage components such as electrodes of ozone generator 118 and can occur, for example, when the oxygen containing gas enters ozone generator 118 at a pressure that exceeds 25 p.s.i.g. Valve 117 is a standard, off-the shelf pressure regulating valve.

Ozone generator 118 can be a conventional ultraviolet light ozone generator, a conventional corona ozone generator, or one of a number of different well known variants thereof. A standard pressure indicator device 119 is generally provided to monitor the pressure at which oxygen and other gases are introduced into the ozone generator 118 and subsequently into soil injector 3A or 3B or lattice conduit inlet 111. Valve 120, such as a standard 316 stainless steel valve, controls the amount of ozone provided via conduit 121 to injector 3A or 3B or inlet 111. (See FIGS. 1, 2, 3A, 3B, 4A and 4B.) Conduit 121 can be a rigid conduit, such as standard 1" 316 stainless steel piping or a flexible conduit, such as tubes of TEFLON having a standard 1" inner diameter.

A device (also called "ozone gas concentration measuring device") 122A for the measurement of ozone concentration is optionally provided in soil 1 at a distant point from the point of injection of the ozone containing gas to determine the actual concentration of ozone in soil 1. In the embodiments described in reference to FIGS. 2, and 4A–4C, ozone gas concentration measuring device 122A (FIG. 5) is optionally placed between 6 inches and 3 feet from a point of ozone injection into the soil.

Another ozone gas concentration measuring device 122B is optionally provided to determine the amount of ozone emitted from soil 1 into the atmosphere. Concentration measurements from measuring device 122A or 122B can be used to estimate the end point of the ozone injection process for achieving the desired results. Ozone gas concentration measuring devices 122A and 122B can be any conventional devices such as an Ozometer available from Hankin Atlas Ozone Industries of Scarborough, Ontario, Canada.

In addition to the in-situ ozonation of soil described above, soil 1 can be treated in-vitro. In vitro ozonation of soil 1 may be necessary (1) in greenhouse applications, (2) in applications requiring greatly reduced ozone emissions for environmental reasons or (3) for reducing ozone's damaging effects on biological organisms in field 2.

Figure 6A:
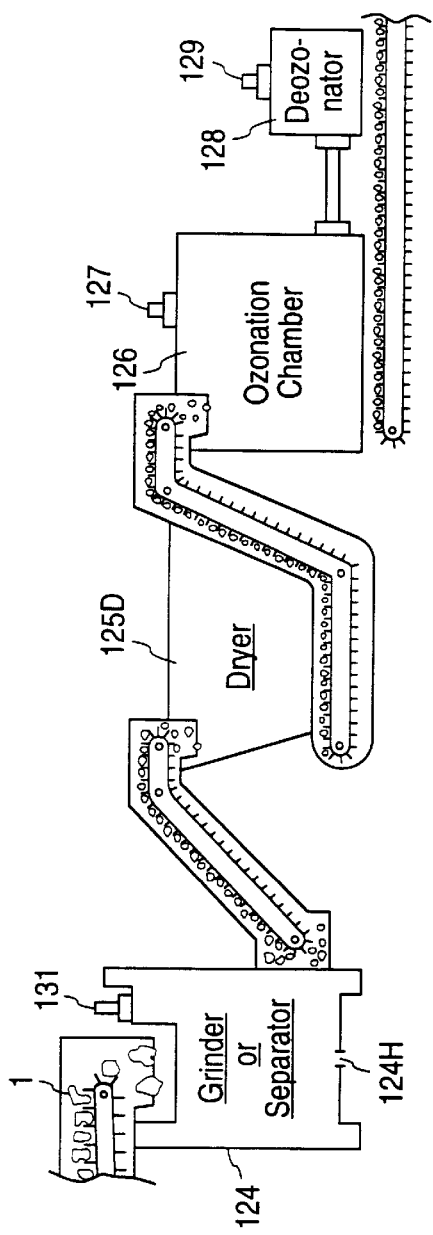
FIGS. 6A, 6B and 6C illustrate, in block diagrams, in-vitro ozonation of soil in various embodiments.

In the embodiment shown in FIG. 6A, top soil 1 suitable for plant growth purposes is removed from field 2 (FIG. 1) for in-vitro ozonation. Soil 1 having clods and agglomerated clumps is placed in an apparatus 124 (FIG. 6A). Apparatus 124 can be a grinder or a separator that renders soil 1 from field 2 (FIG. 1) relatively uniformly homogeneous by a conventional process such as grinding and mixing or screening or similar processing of soil 1. The relatively uniform soil 1 to is oversaturated by adding water (as described herein) through inlet 131 to soil 1 form a slurry in apparatus 124. The oversaturation is preferably (but not necessarily)

followed by desaturation e.g. transferring the slurry to chamber (also called "dryer") 125D and mixing with dry soil or unsaturated soil, so that soil 1 has the necessary amount of water (e.g. 25% by weight for artificial nursery soils) immediately prior to ozonation.

Alternatively, an amount of water greater than the amount necessary for saturation is added to soil 1 in apparatus 124, and excess water that cannot be held by soil 1 is drained out through an optional hole 124H (FIG. 6A) at the bottom of apparatus 124, thereby to create saturated soil 1 that is then transferred to chamber 125D. In such an embodiment, desaturation in chamber 125D can be performed by exposing saturated soil 1 to hot air instead of or in addition to the mixing with dry or unsaturated soil.

After saturation (and optional desaturation) as described above, soil 1 is exposed to an ozone containing gas in ozonation chamber 126 at a temperature less than or approximately equal to 110 degrees Fahrenheit (both soil 1 and the gas in chamber 126 are at a temperature less than or equal to 110 degrees Fahrenheit). The maximum upper temperature is 110 degrees Fahrenheit because ozone reverts back into diatomic oxygen at temperatures exceeding approximately 110 degrees Fahrenheit. Gaseous ozone remains intact for the longest time period when the temperature is minimized to the greatest extent possible. Therefore soil 1 can be at or below room temperature in chamber 126. The temperature of soil 1 should be above the freezing point of water.

Figure 7:
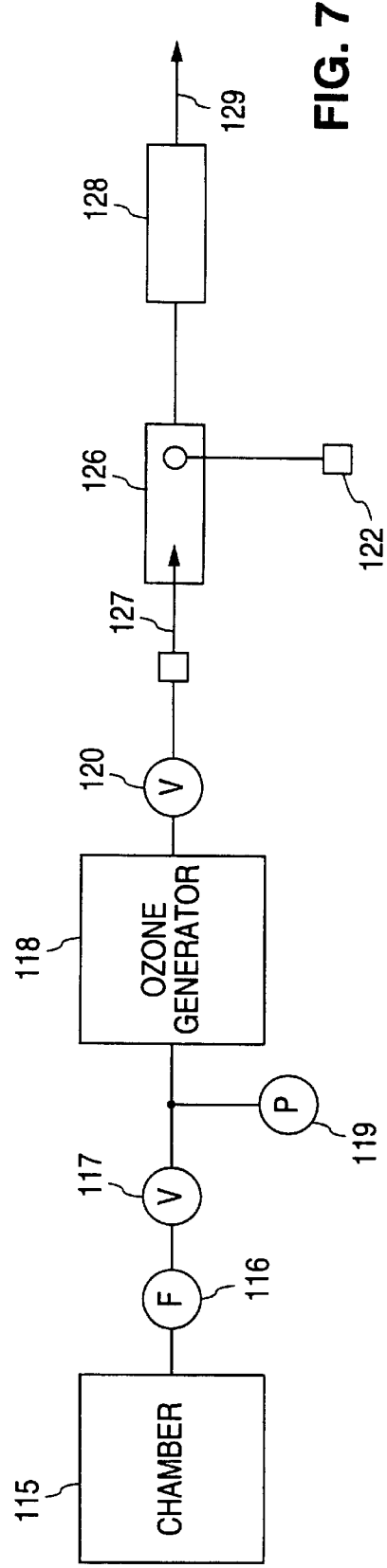
FIG. 7 is a block diagram illustrating the processing of ozone for the in-vitro ozonation methods shown in FIGS. 6A–6C.

The ozone containing gas is supplied at inlet 127 of ozonation chamber 126 from an ozone generator 118 (FIG. 7). In FIGS. 6A and 7, ozonation chamber 126 is an enclosure that holds soil 1 and into which the ozone containing gas is injected. Ozonation chamber 126 of FIGS. 6A and 7 can be any size pipe or chamber with an ozone containing gas going in at one end and out at the other end.

The gases vented from ozonation chamber 126 are directed through a conduit to a deozonation chamber 128. Deozonation chamber 128 contains a catalyst to destroy any unconsumed ozone. The catalyst in deozonation chamber 128 can be activated carbon, manganese dioxide, or any other catalyst capable of destroying ozone or causing reversion of ozone to oxygen. Optionally, the vented gases may be heated to thermally destruct any ozone. The deozonated gases at outlet 129 of deozonator chamber 128 are environmentally safe and can be vented to the outside world.

Figure 6B:
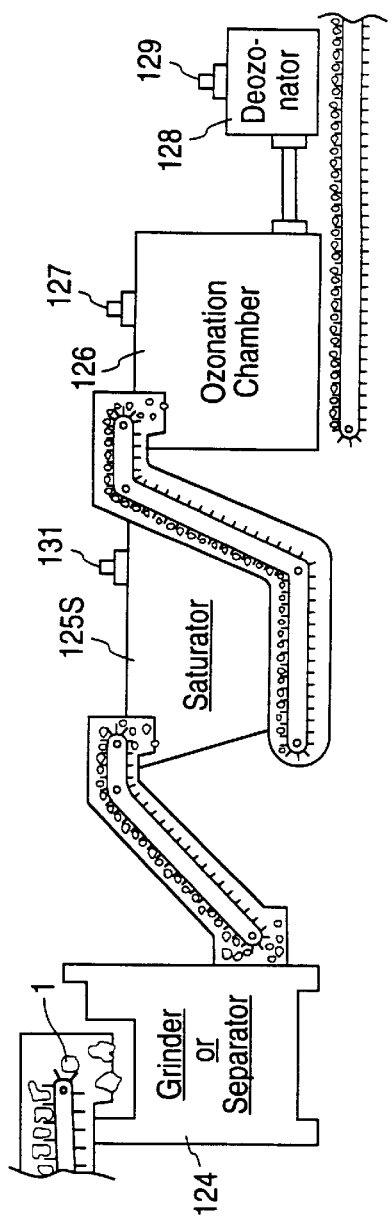

In an alternative embodiment, apparatus 124 does not have a water inlet 131 and a hole 124H (FIG. 6B), and instead includes a chamber (also called "saturator") 125S having a water inlet 131. In this embodiment, the relatively uniform soil 1 is transferred from apparatus 124 (FIG. 6B) to saturator 125S, followed by mixing with water in saturator 125S until soil 1 has the necessary amount of water (e.g. 25% by weight as described above) immediately prior to ozonation. Thereafter, soil 1 is ozonated in chamber 126 as described above in reference to FIG. 6A.

Figure 6C:
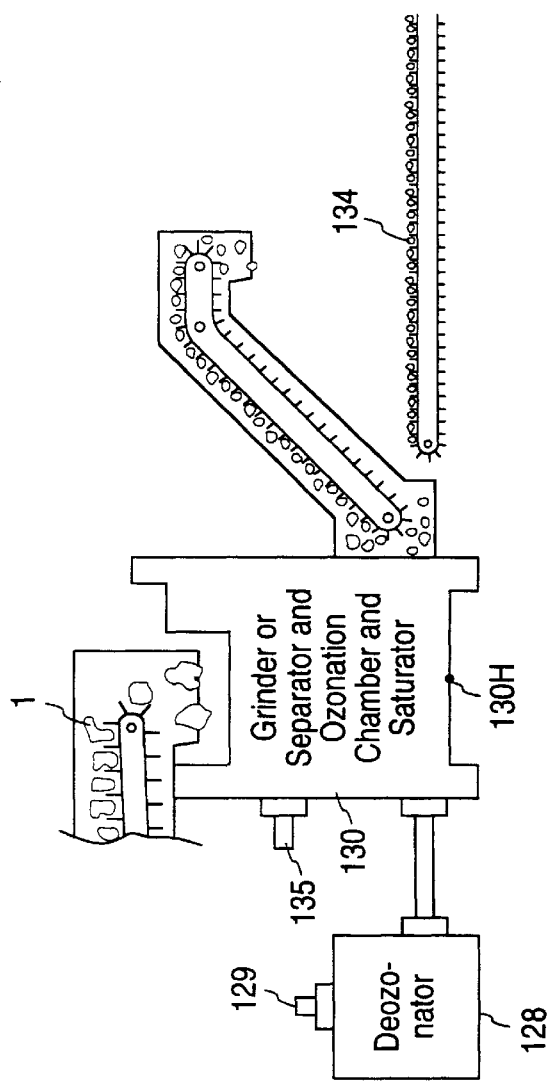

In still another embodiment, an apparatus 130 (FIG. 6C) includes a grinder or separator or both, and also functions as an ozonation chamber and a saturator. Specifically, apparatus 130 has an inlet 135 that is coupled to an aspirator that injects a mixture of ozone containing gas and water as described above in reference to FIG. 4C. Therefore, in this embodiment, soil 1 is saturated and ozonated simultaneously. The saturated and ozonated soil 1 is thereafter transferred to a conveyor belt 134 and thereafter used for growing plants by use of the byproducts as described herein. The method described in reference to FIGS. 6A–6C can be used in green houses.

Table 1 (below) demonstrates the efficacy of the increases in the fungi Trichoderma, spp. due to in-vitro ozonation of soil 1 in the manner described above in reference to FIGS. 6A–6C.

TABLE 1

| Moisture (% by weight) | Ozone Dosage (1) | Trichoderma sp. CFU/g soil (2) |
| --- | --- | --- |
| 0.5% | Control (no ozone) | 135,000 |
| 0.5% | 158 lbs O3/acre | 67,500 |
| 0.5% | 1,580 lbs O3/acre | 33,700 |
| 2.5% | Control(no ozone) | 135,000 |
| 2.5% | 158 lbs O3/acre | 102,000 |
| 2.5% | 1,580 lbs O3/acre | 169,000 |
| 5.0% | 158 lbs O3/acre | 791,000 |
| 5.0% | 1,580 lbs O3/acre | 5,230,000 |
| 7.5% | Control (no ozone) | 244,000 |
| 7.5% | 158 lbs O3/acre | 1,320,000 |
| 7.5% | 1,580 lbs O3/acre | 15,600,000 |

(1) Ozone produced in air as carrier gas, at a concentration of 1% by weight, injected at 70 deg F. and 5 p.s.i.g. into a cylinder of soil 6" long×2" diameter.

(2) CFU means Colony Forming Units; ozonated soil samples were extracted and plated on Trichoderma Specific Medium I in the normal manner (e.g. medium is formed of 3.0 g glucose, 0.15 g KCl, 0.2 g $MgSO_4$ $7H_2O$, 1 liter water, 1.0 g $Nh_4No_3$, 0.9 g $K_2HPO_4$ and 15 g Agar, and after autoclaving, add 250 mg chloramphenicol, 300 mg fenaminosulf, 200 mg quintozene, and 150 mg Rose Bengal).

Soil 1 was prepared for ozonation as described above in Table 1 as follows. 1,000 g of distilled water was added to 1,000 g of soil 1 and mixed to a uniform consistency at approximately 68 deg. F. Within 2–12 hours, an appropriate amount of air dried soil (with a moisture level of less than 0.5%) was added to this slurry to yield the final desired moisture level. For instance, 100 g of slurry (at 50% moisture level) was mixed after 2 hours with 400 g of dried soil to yield soil 1 at 10% moisture level. The resulting soil 1 was ozonated within 4 hours of final mixing.

Figure 8:
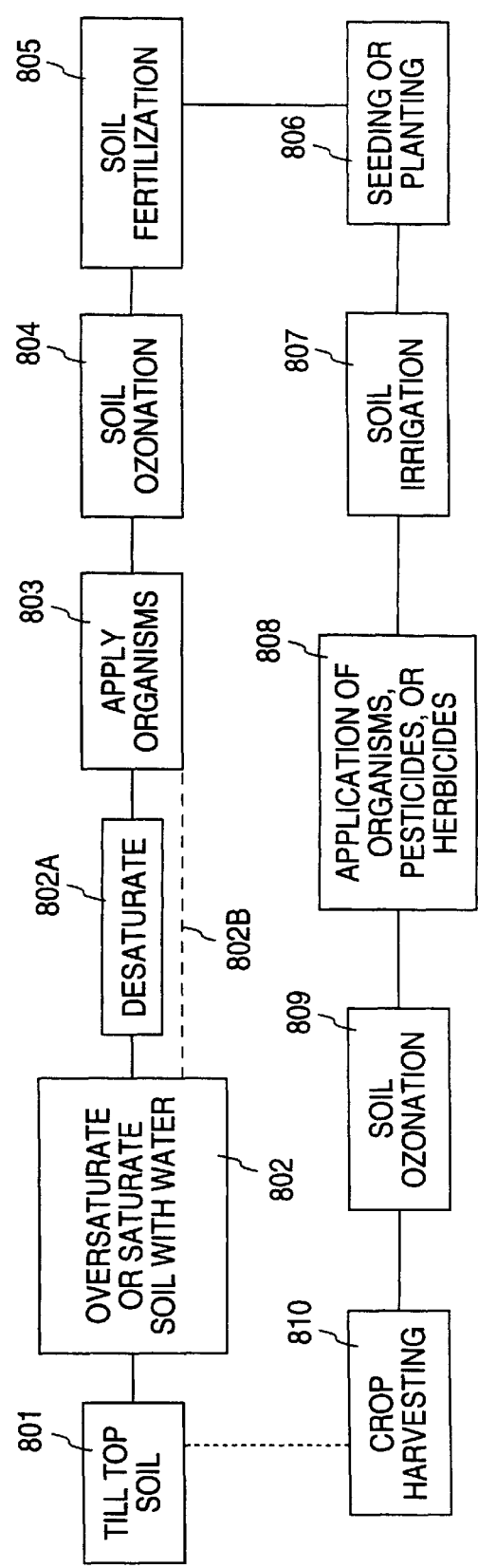
FIG. 8 illustrates a method for using ozone in conjunction with agricultural methods to grow plants in one embodiment.

As seen from Table 1, injection of ozone containing gas at a relatively low pressure (e.g. 5 psig) into relatively homogeneous (e.g. passed through a screen with ⅛ inch square holes) and relatively moist (e.g. having a moisture content greater than 2.5% by weight) soil 1, followed by exposure of saturated molecules in soil 1 to ozone for a minimum period of time (depending on the ozone concentration) results in byproducts that increase the propagation and growth of first fungi Trichoderma spp. by almost sixty-four (64) times. Such a large increase in the growth of a specie of fungi by use of the byproducts of top soil ozonation is unexpected and revolutionary. Note that prior to the above-described ozonation the first fungi Trichoderma spp. was naturally occurring in soil 1, although such fungi can also be added to soil 1 as described below in reference to step 803 (FIG. 8).

Table 2 (below) demonstrates the efficacy of the increases in tomato plant growth and yield due to in-vivo ozonation of soil 1 in the manner described above in reference to FIG. 4A.

TABLE 2

| Ozone Concentration (1) Soil Moisture (% by weight) | Avg. Fruit Yield (kg/plot) | Root Gall Rating (2) |
|---|---|---|
| Control (no ozone) | 1.72 | 9.44 |
| 250 lbs O3/acre & 2.5% Average Moisture | 1.70 | 7.46 |
| 250 lbs O3/acre & 9–17% Average Moisture | 3.08 | 7.88 |

(1) Ozone was produced with oxygen as carrier gas, at a concentration of 3% by weight, injected at 70 deg F. and 17–19 p.s.i.g. into ½ inch diameter drip piping (e.g. conduits 110A–110M in FIG. 4A) buried 4 inches deep beneath the soil in the center of 32 inch wide furrows in five randomly placed 20 feet length plots.

In this example, soil in the volume enclosed by 12 inch width, 20 feet length and 8 inch depth is believed to be ozonated. Prior to the ozonation, at least 10% of the soil in the enclosed volume (also called "to-be-ozonated soil") was oversaturated with water passed through the drip piping, resulting in an average moisture (as described in Table 2) for the to-be-ozonated soil. The addition of water was followed 3 days later by ozonation (at which time a portion (e.g. 5%) of the to-be-ozonated soil was still at least saturated). Tomato seedlings were planted three weeks after the ozonation.

(2) A root gall is a biomass formed in a root of a plant at a site attacked by a nematode, and the numbers of root galls are rated as follows: 0=no galling; 10=heavily galled. Heavily galled ratings were obtained by comparative inspection of roots of five plants per soil sample, wherein heavily galled plants indicated the most severe infestation by root knot nematodes.

Table 2 shows a statistical difference between fruit yields in the control soil samples and in 9–17% moisturized (average) and ozonated soil samples (see last row in Table 2) based on Analysis of Variance followed by Duncan's New Multiple Range Test or Fisher's Least Significant Difference Test that are both well known in the art of measurement of fruit yields.

There is no statistical difference in fruit yields between the control soil samples and 2.5% moisturized (average) and ozonated soil samples. There is also no statistical difference among all the soil samples with respect to root gall ratings, thereby indicating that ozone had a negligible biocidal effect on the nematodes during top soil ozonation.

As seen from Table 2, injection of an ozone containing gas at a relatively low pressure (e.g. 15 psig) into disced, tilled and moistened soil 1, and the subsequent planting of soil 1 with seeds results in increased plant growth in soil 1, even in the absence of a commensurate statistical decrease in root galls. Therefore top soil ozonation increased the average total fruit weight production by approximately 79% as compared to untreated control soil even in the absence of the biocidal effect described by U.S. Pat. No. 5,566,627. A similar process for carrots yielded an increase to 50–65% in total marketable carrot weight as compared to untreated control soil.

Top soil ozonation as described herein can be used in conjunction with other agricultural methods, such as irrigation, fertilization and tilling. As illustrated in FIG. 8, in one embodiment soil 1 that is fit for plant growth purposes is tilled in step 801. Soil 1 can be top soil of a field 2 (FIG. 1) that was previously cultivated for plant growth. Instead of or in addition to tilling in step 801, other methods of rendering soil homogeneous, such as shanking, discing, and springtoothing can also be used. Alternatively, the soil used in step 801 can be soil that was previously used for other purposes and yet is suitable for plant growth purposes.

Note that in the method illustrated in FIG. 8, irrigation as described in U.S. Pat. No. 5,566,627 at column 11, lines 9–12 can be performed prior to tilling step 801, e.g. if soil 1 is so dry that dust rises during tilling step 801 by an amount that (1) affects air quality to an extent defined by the Environmental Protection Agency (E.P.A.) to be detrimental; or (2) exposes humans in field 2 to dust to an extent defined to be harmful by Occupational and Safety Health Administration (O.S.H.A.); or (3) carries a predetermined number (e.g. 1000 per acre) living organisms (such as fungi and aphids) into a neighboring field.

After tilling step 801, soil 1 is irrigated in step 802 with an amount of water sufficient to ensure saturation of soil 1. For example, a majority of soil 1 in field 2 is oversaturated in one embodiment. Alternatively, soil 1 is allowed to saturate or oversaturate naturally, e.g. due to rain. The amount of water added to soil 1 used during such a saturation step depends on the composition of soil 1 (e.g. after saturation, the total water can form 25% by weight for organic soils).

In a first example, after saturation step 802, a parent molecule (described above) is formed by hydration of a molecule (also called "grandparent molecule") that is otherwise unhydrated prior to saturation step 802. Examples of such hydrated molecules include proteins. In a second example, after saturation step 802, the parent molecule is formed by dissolving a grandparent molecule (such as an alcohol, an aldehyde, a ketone, an organic acid or an organic oxide) that is soluble in water, but is undissolved prior to the saturation step.

In a third example, instead of the parent molecule, a byproduct of ozonation is hydrated or dissolved in the water added during saturation step 802. An example of a dissolved byproduct generated from undissolved/insoluble parent molecules is acetic acid. Therefore, even if a byproduct is normally incapable of interacting with a plant cell, the byproduct dissolves in the added water and acts e.g. as a nutrient that passes through a cell wall.

Saturation of soil 1 with water as described above is not performed during conventional agricultural operations (e.g. irrigation) prior to tilling because (1) a vehicle (such as a tractor) cannot be operated in saturated soil in field 2, because the vehicle becomes stuck in the saturated soil and (2) operating a vehicle on saturated soil results in compaction of the soil. Hence, saturation in step 802 after tilling in step 801 in the order described herein is a critical aspect in one embodiment.

Saturation in step 802 adds sufficient water to ensure that one or more molecules in soil 1 that are otherwise unexposed to water dissolve or hydrate in the added water, and release nutrients or stimulants on ozonation. In one implementation, a majority (i.e. greater than 50%) of molecules in soil 1 that is otherwise not exposed to water interact with the water added during saturation step 802. Moreover, the added water also causes cells to emerge from a state of anhydrobiosis (dormancy induced by dehydration) wherein the cells e.g. fungus or cells of chlorophyll-bearing plants such as root cells are less susceptible to the effects of the byproducts of top soil ozonation.

In one implementation, saturation step 802 is followed immediately by the desaturation (in step 802A) of saturated soil 1 (e.g. naturally by exposure to sun, or artificially by pumping hot air) to a moisture level below but almost at saturation (e.g. 0.1 percent below saturation). Desaturation step 802A allows the ozone containing gas to more easily penetrate and permeate top soil 1 than if soil 1 remained saturated. Desaturation step 802A does not remove so much moisture from soil 1 that a majority of cells in soil 1 enter a state of anhydrobiosis, or that a majority of molecules that were dissolved or hydrated in step 802 become undissolved or dehydrated.

Desaturation can also be performed by mixing unsaturated soil with soil 1 that has been saturated by step 802, e.g. in equal proportions by weight. Instead of equal proportions, any other appropriate proportions can be used to yield a desired level of moisture in the soil that results from the mixing.

Note that desaturation step 802A is an optional step as illustrated by branch 802B. Thereafter in step 803 living organisms such as fungi (e.g. Trichoderma spp.) are applied to soil 1. Depending on the prior state of soil 1, such fungi may be naturally occurring (i.e. be already present) in soil 1, thereby eliminating the need for step 803. Therefore, in one embodiment, top soil ozonation causes the growth of naturally occurring fungi (e.g. Trichoderma spp.), and such fungi grown by ozonation enhance the growth of other plants (such as crops) that are added to soil 1 (as described below in reference to step 806).

Moreover, in two alternative embodiments, step 803 is performed prior to step 802, or prior to step 801. In one embodiment, the fungi added in step 803 are selected to be resistant to ozonation in step 802, so that at least a majority of such fungi remain alive after ozonation, i.e. are not killed (as described in U.S. Pat. No. 5,566,627). Instead, a majority of the resistant fungi experience enhanced growth due to exposure to the byproducts of top soil ozonation.

The fungi added in step 803 can withstand ozonation in two ways either (1) by being not affected by exposure to ozone (as described above) or (2) by being not directly exposed to ozone. The second way is used by saturation, because water forms a coating on the cell wall of Trichoderma, spp., and the coating protects the cell wall from oxidation by ozone gas. The byproducts that are more polar than the parent molecules pass through the coating and cause Trichoderma spp. to grow.

It is believed that various fungi (e.g. *verticellium* and *fusarium*) that are pathogenic (e.g. detrimental to the to-be-grown plants such as strawberries and tomatoes) may also have such a protective coating and not get killed by interaction with ozone, e.g. as described in U.S. Pat. No. 5,566,627. However, such pathogenic fungi are destroyed by the parasitic fungus Trichoderma spp. that is grown according to the principles of this invention (an example of indirect growth enhancement).

Therefore, depending on the moisture level in top soil 1, and depending on the living organisms that are exposed to the byproducts or directly to ozone, the same ozone gas acts as a biostimulant as described herein, or as a biocide as described in U.S. Pat. No. 5,566,627, or both. The biostimulative effect of top soil ozonation on fungus is particularly noticeable when top soil 1 is saturated prior to ozonation (e.g. as described in Tables 1 and 2). In contrast, ozone's biocidal effect is more pronounced (1) on living organisms other than Trichoderma spp. e.g. bacteria, and (2) when the soil is drier as described in U.S. Pat. No. 5,566,627.

Therefore, the moisture level of top soil 1 prior to ozonation is a critical aspect in one embodiment of this invention. In one implementation of this embodiment, soil 1 has no pathogenic organisms (as described in U.S. Pat. No. 5,566,627) that are harmful to the plants to be grown in soil 1, and yet soil 1 is ozonated as described herein to obtain the benefit of biostimulation, e.g. to generate byproducts to be used in enhancing the growth of plants.

In another implementation of this embodiment, gaseous ozone is used as a biostimulant for Trichoderma spp. that is applied to soil 1 after ozonation. In this implementation, the biocidal effect is secondary (i.e. less than a majority of organisms living in top soil 1 interact with the ozone), e.g. because (1) ozone interacts primarily with organic and inorganic compounds, or (2) the organisms are already dead or are unaffected by ozone either due to anhydrobiosis or due to the protective coating of water added during saturation as described herein. Therefore, ozone is applied to soil 1 even in the absence of a need to kill or weaken living organisms as described in U.S. Pat. Nos. 5,566,627 and 5,624,635.

In another embodiment, gaseous ozone is used in both ways, e.g. as a biocide that kills bacteria and as a biostimulant that causes growth and propagation of a fungus, e.g. Trichoderma spp. Note however that such biocidal use is not necessary for ozone to be used as a biostimulant in the embodiment described in the previous two paragraphs.

An increase in the growth of a fungus by use of an ozonation byproduct as described herein allows the amount of fungi applied in step 803 to be significantly smaller, e.g. 90% smaller, than the amount normally applied in the prior art. In one particular implementation, the normally applied amount is in the range of $84–168 \times 10^7$ CFU/m$^3$ of soil, and only 1/64th of such an amount is applied in conjunction with top soil ozonation as described herein.

Also, the fungi added in step 803 is selected to increase the growth of chlorophyll-bearing plants to be grown in soil 1. Specifically, the fungi can act as a stimulant for the plant, or the fungi is fungicidal to other fungi (also called "pathogenic fungi") that are detrimental to the to-be-grown plants (e.g. tomatoes and strawberries) or both. As noted above, fungus Trichoderma spp. acts in both ways, and is therefore preferred in one embodiment over other fungi. If a fungus is not resistant to top soil ozonation, such a fungus can be added in a step that is performed subsequent to step 804 (described below).

Next, in step 804, soil 1 is treated with an ozone containing gas, as described above, to form byproducts. Note that in this embodiment, ozonation is performed after tilling step 801, saturation step 802 and desaturation step 802A, and the just-described order of these steps is a critical aspect of this embodiment. The byproducts generated by step 804 dissolve in the water previously added in saturation step 802, and cause increased plant growth. A byproduct can act e.g. as a stimulant that contacts a cell wall of a fungus, or as a nutrient that passes through the cell wall of the fungus. Therefore, the fungus experiences enhanced growth as compared to the prior art. In one embodiment, a majority of fungi Trichoderma, spp. in soil 1 experience enhanced growth due to byproducts generated by top soil ozonation as described herein.

Thereafter, in step 805, soil 1 is fertilized with fertilizers, such as calcium nitrate. Then in step 806, seeds are sown or seedlings are transplanted in soil 1. The plants from such seeds or seedlings experience enhanced growth due to the stimulation and propagation of fungi in step 804, and also due to byproducts that did not interact with the fungi. Then in step 807, soil 1 is once more irrigated. Next, in an optional step 808 herbicides or other pesticides may be sprayed or applied over the plants or soil, or additional microorganisms may be applied. Then in step 809, soil 1 is optionally ozonated again. Next, in step 810 the crop is harvested.

In the embodiment of FIG. 8, steps 801–810 can be repeated for another season by starting at step 801 after completion of step 810. In one embodiment, the same conduits 110 (FIG. 4A) are used for irrigation in step 802, fertilization in step 805, application of microorganisms in steps 803 and 808, and application of pesticide or herbicide in step 808.

Therefore, treatment of soil with an ozone containing gas is easy and results in significant efficiency in causing the propagation and growth of chlorophyll-bearing plants in soil 1 in an environmentally benign manner and provides a much needed alternative to methyl bromide. The increase in propagation and growth of living organisms by treatment of top soil 1 with an ozone containing gas is an unexpected result that satisfies a long felt need for improving yields in farming.

The above description of various embodiments of this invention is intended to be merely illustrative and not limiting. Numerous other embodiments will be apparent to those skilled in the art of agriculture, all of which are included in the scope of this invention. Although in one embodiment, soil 1 is ozonated after tilling, irrigating, and applying microorganisms, soil 1 can be ozonated at any time, for example after additional irrigations or immediately before harvesting.

Also, soil 1 can be treated with a pesticide prior to, during or subsequent to ozonation or some combination thereof. Although this description refers to the propagation and growth of a majority of fungi (or chlorophyll-bearing plants) in soil 1, any predetermined percentage of specifically selected organisms can be caused (by stimulation or by nutrition from byproducts of top soil ozonation) to propagate and grow by appropriately selecting various parameters to achieve a predetermined growth rate of specific plants, such as strawberries.

Furthermore, although certain concentrations of ozone in an ozone containing gas are discussed herein, ozone can be applied to top soil in other concentrations, e.g. 10% by weight in one embodiment. Moreover, although in some embodiments soil 1 is saturated, in other embodiments a predetermined amount of water (less than the saturation amount) that is known to cause the propagation and growth of living organisms from ozonation byproducts as described above is added to soil 1 (e.g. by stirring soil 1 while adding water in a chamber), thereby eliminating the need for saturation in another embodiment.

Numerous such modifications and adaptations of the embodiments described herein are encompassed by the attached claims.

I claim:

1. A method for growing plants in a field, said method comprising:
    artificially oversaturating at least a portion of a top soil with water, said top soil being suitable for plant growth purposes prior to said oversaturating and after harvest of a crop;
    desaturating said portion of said top soil subsequent to said artificially oversaturating until a moisture level in said top soil is at least 0.1 percent below saturation;
    injecting a gas comprising ozone and a carrier gas into said portion of said top soil subsequent to said desaturating thereby to obtain a treated soil; and
    growing a first plant in said treated soil.
2. The process of claim 1 wherein:
    said desaturating includes mixing additional soil in said top soil.
3. The method of claim 1 wherein:
    said first plant is a first fungus.
4. The method of claim 3 wherein:
    said first fungus is Trichoderma spp.

5. The method of claim 3 wherein:
    said top soil further comprises a second plant; and
    said first fungus interacts with said second plant.
6. The method of claim 5 wherein:
    said second plant is a second fungus; and
    said first fungus is parasitic to said second fungus.
7. The method of claim 6 wherein:
    said first fungus is Trichoderma spp.
8. The method of claim 5 wherein:
    said second plant contains chlorophyll; and
    said first fungus is a stimulant for said second plant.
9. The method of claim 1 wherein:
    said top soil is exposed to ozone for a period of time such that a time weighted average of ozone concentration in the air over said field results in exposure to humans of less than
    (a) 0.1 part per million in eight hours; and
    (b) 0.3 part per million in fifteen minutes.
10. The method of claim 1 wherein:
    said ozone concentration is greater than or approximately equal to 0.1 part per million by weight of said gas.
11. The method of claim 1 further comprising:
    rendering said top soil relatively homogeneous in texture prior to said injecting.
12. The method of claim 1 further comprising:
    covering at least said portion of said top soil with a membrane that is either impermeable or semipermeable to said ozone.
13. The method of claim 1 further comprising:
    passing water through conduits buried in said field; and
    passing the gas comprising ozone ($O_3$) through the conduits into said portion of said top soil.
14. A method for treatment of a field, said method comprising:
    rendering a top soil of said field homogeneous, said top soil being suitable for plant growth purposes;
    artificially oversaturating at least a portion of said top soil subsequent to said rendering;
    desaturating said portion of said top soil subsequent to said artificially oversaturating until a moisture level in said top soil is at least 0.1 percent below saturation; and
    injecting a gas comprising ozone ($O_3$) and a competitive agent into said portion subsequent to said artificially oversaturating.
15. The method of claim 14 wherein:
    said competitive agent includes carbon dioxide ($CO_2$).
16. The method of claim 14 further comprising:
    applying fungi to said top soil, said fungi including Trichoderma, spp.; and
    growing said fungi.
17. The method of claim 16 wherein:
    said applying is performed prior to said artificially oversaturating.
18. A method for growing plants in a field, said method comprising:
    oversaturating at least a portion of a top soil with water, said top soil being suitable for plant growth purposes prior to said oversaturating and after harvest of a crop;
    desaturating said portion of said top soil subsequent to said oversaturating until a moisture level in said top soil is at least 0.1 percent below saturation;
    injecting a gas comprising ozone and a carrier gas into said portion of said top soil subsequent to said desaturating thereby to obtain a treated soil; and
    growing a first plant in said treated soil.

* * * * *